United States Patent [19]

Bloomquist

[11] Patent Number: 4,738,174
[45] Date of Patent: Apr. 19, 1988

[54] ALIGNMENT METHOD AND APPARATUS FOR FLUID JET CUTTING SYSTEM

[75] Inventor: Larry Bloomquist, Renton, Wash.

[73] Assignee: Flow Systems, Inc., Kent, Wash.

[21] Appl. No.: 61,004

[22] Filed: Jun. 10, 1987

Related U.S. Application Data

[63] Continuation of Ser. No. 813,436, Dec. 26, 1985, abandoned.

[51] Int. Cl.[4] .............................................. B26F 3/00
[52] U.S. Cl. .......................................... 83/53; 83/177; 33/180 R; 33/628
[58] Field of Search ................. 83/177, 53; 33/180 R, 33/181 R, 184 R, 186

[56] References Cited

U.S. PATENT DOCUMENTS 2,876,554  3/1959  Reynard ............................ 33/181 R
3,601,897  8/1971  Muller ........................... 33/181 R X
3,978,748  9/1976  Leslie et al. ............................... 83/53
4,060,906 12/1977  Heizmann ........................ 33/181 R Primary Examiner—Donald R. Schran
Attorney, Agent, or Firm—Ashen, Golant, Martin & Seldon

[57] ABSTRACT

A fluid jet cutting system is described having a nozzle (12) through which a fluid jet is directed for cutting a workpiece (15). The workpiece (15) is supported using pins (17) each of which is provided with an alignment device in the form of a generally tubular body (104) provided with a through hole (106). The relative positions of the nozzle and workpiece (15) can be adjusted until the fluid jet passes through the through hole (106) with minimum disturbance.

In alternative embodiments, the alignment device may be provided by a cap permanently affixed in an alignment plate, or it may be constituted by the pin (17) itself.

The alignment system provides a simple method for visually verifying the jet alignment to a reference point before controlled cutting is carried out.

15 Claims, 2 Drawing Sheets

ALIGNMENT METHOD AND APPARATUS FOR FLUID JET CUTTING SYSTEM

This is a continuation of co-pending application Ser. No. 813,436 filed on Dec. 26, 1985, now abandoned.

This invention relates to fluid jet cutting systems. Cutting by means of a high velocity fluid jet is well known in the art. Typically, a fluid such as water is compressed to a pressure of 55,000 lbs. per sq. inch and forced through a jewel nozzle having a diameter of 0.003 to 0.030 inches, generating a axially-directed jet having a velocity of up to three times the speed of sound. The jet thus produced can be used to cut through a variety of metallic and non-metallic materials such as steel, aluminum, paper, rubber, plastics, and so forth.

The metallic/non-metallic workpiece is supported or impingement by the jet at an axially spaced distance from the nozzle: typically, 0.10 to 2.50 inches.

During the cutting operation, relative movement is provided between the workpiece and the nozzle. Typically, the nozzle is mounted to a "x-y" table for two-dimensional movement with respect to the workpiece. Naturally, means for moving the nozzle in a third dimension, towards or away from the workpiece, and/or a fourth dimension (i.e., rotationally) can be provided if desirable.

The movement of the cutting nozzle is frequently controlled by means of a microprocessor which moves the nozzle through a succession of coordinate-defined positions in accordance with programmed instruction. To insure that cuts in the workpiece are accurately made, substantial attention is given to insuring that the workpiece is precisely positioned on the support means so that the programmed coordinates accurately locate the nozzle position with respect to the workpiece. By way of example only, the support means commonly includes tooling fixtures to accurately position the workpiece on the support means. For example, the tooling fixtures may include a plurality of locating pins which fit within mating holes of the workpiece. Alternatively, the tooling may provide holes which mate with pins or other extending members of the workpiece.

While the tooling fixtures may accurately position the workpiece on the support means, provision must also be made to minimize or eliminate the error between the actual and theoretical position of the cutting nozzle. The programmed coordinate values utilized by the microprocessor presume that the cutting nozzle has been initialized to a reference point prior to the start of the cutting operation. Accordingly, the accuracy of the nozzle's location has been determined by actually cutting a piece of material, checking to determine whether the cut was made as intended, adjusting the position of the nozzle, and repeating the cutting process to verify the correction.

In accordance with the invention, a method for aligning the fluid jet with reference position is disclosed wherein a target hole is positioned at a reference point axially spaced from the fluid jet nozzle. The target hole includes at least an axially-extending segment having a slightly larger effective cross-section than the cross-section of the fluid jet. A jet of fluid is then produced at less pressure than that required for cutting, and the relative positions of the fluid jet nozzle and target hole segment are adjusted for minimal disruption of the fluid jet as it passes through the hole segment.

In its simplest embodiment, the target hole may be a simple through hole formed in an alignment member and having an essentially constant diameter as measured from its axis. Alternatively, the target hole may be funnel-shaped with its sidewalls converging towards an axially-extending segment having a slightly larger effective cross-section than the cross-section of the fluid jet.

The term "effective cross-section" is used to denote the cross-sectional dimensions of the target hole in the plane normal to the fluid jet axis. In accordance with the invention, an alignment device is provided for positioning the fluid jet at a reference position comprising means defining a target gap having a slightly greater effective cross-section than the cross-section of the fluid jet, and mounting means for axially spacing the gap from the nozzle at the reference position.

In essence, I have discovered that the fluid jet from the nozzle will pass through an orifice only slightly larger in cross-section, without disruption of the jet when the centers of the jet and orifice are aligned. Any misalignment between the centers is visually evident due to a substantial amount of spray created by the deflection of the jet from the material surrounding the target hole. Accordingly, visual verification of the jet's alignment to the reference point is easily accomplished.

Additional advantages and details concerning the invention will be evident from the following description of the preferred embodiment, of which the following drawing is a part.

DESCRIPTION OF THE PREFERRED EMBODIMENT

Figure 1:
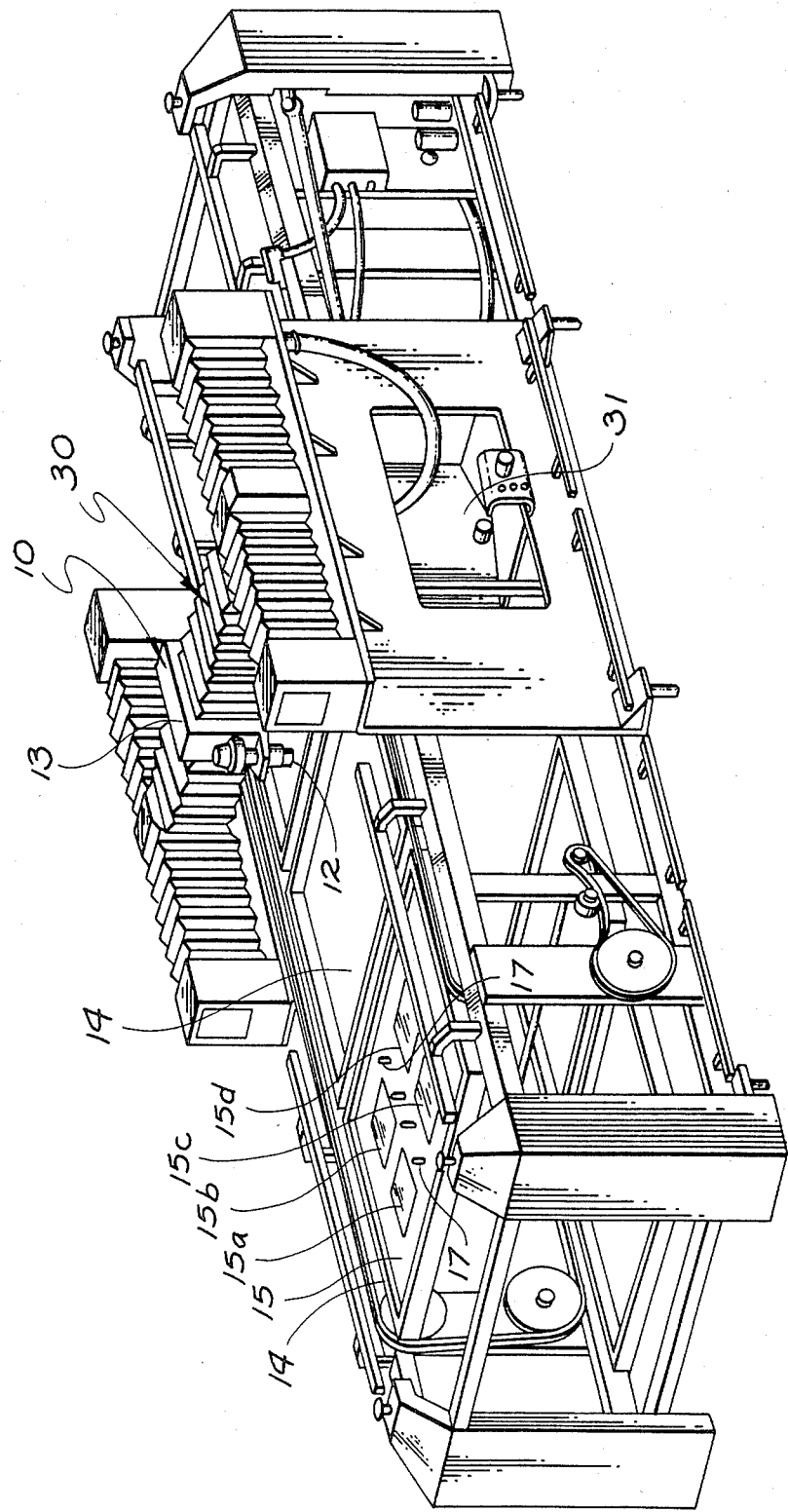
FIG. 1 is a perspective view of a fluid jet cutting system constructed in accordance with the invention.

FIG. 1 is a perspective view of a fluid jet cutting system utilizing the alignment device described herein. The cutting system comprises a cutting head 10 mounted for movement in two dimensions on an x-y table 30. The cutting head 10 includes a high pressure fluid nozzle 12 in fluid communication with a high pressure intensifier 13. Pressure intensifiers are well known in the art; one such intensifier is the subject of U.S. Pat. No. 3,811,795 assigned to the assignee of this invention, the contents of which are hereby incorporated by reference.

The nozzle 12 forms a high velocity jet of fluid, such as water, having a diameter of approximately 0.003 to 0.014 inches and a speed of approximately 3,000 fps. The fluid jet is the medium which cuts a workpiece lying below the nozzle. In FIG. 1, the intended workpiece is a masterboard of printed circuit board material.

The masterboard is supported approximately 0.10 to 2.50 inches below the nozzle on a generally flat, rectangular platten 14. A plurality of such plattens 14 are, in turn, supported by the frame 2.

Each platten 14 supports a tooling plate 15, illustrated only on the left-most platten 14 in FIG. 1. The tooling plate 15 has four apertures 15a–d through which the top surface of the platan is exposed. The four apertures define the cutting areas over which four masterboards are respectively placed utilizing axially-extending index pins 17 in a manner known in the art.

In FIG. 1, two pairs of index pins 17 are illustrated adjacent apertures 15a, 15d respectively. Two additional pairs of index pins are similarly adjacent aperatures 15b, 15c but are hidden from view by a side rail 33. The pins 17 fit tightly within precisely located holes in the masterboards.

Although only one nozzle 12 is illustrated in FIG. 1 for visual clarity, those skilled in the art will recognize that the illustrated tooling arrangement is frequently used in conjunction with four simultaneously moved cutting heads. In such multiple nozzle arrangements, the nozzles are capable of independent movement for alignment purposes, and are thereafter moved together to cut the four masterboards simultaneously.

A catcher 31 is positioned below the illustrated nozzle 12 on the opposite side of the platans 14. Catchers are generally open-topped vessels which catch spent cutting fluid and kerf material and which dissipate remaining kinetic energy of the fluid jet.

During a cutting operation, a masterboard is placed on the tooling fixture 15 associated with a platan at one end of the illustrated conveyor system. The masterboard is subsequently transported to a position underlying the nozzle 12 by conveyor means under microprocessor control. Details concerning the conveyor means are beyond the scope of this application and, for the sake of brevity, are not described in detail.

Once the masterboard has been transported to a position underlying the nozzle 12, the nozzle is activated by the microprocessor to produce the cutting jet. The x-y table 10 is responsive to microprocessor control to move the nozzle in the direction of platan travel, as well as transversely thereto, to make one or more cuts in the masterboard.

The cutting path(s) of the fluid jet is defined by data read by the microprocessor. The data is, in essence, information concerning the coordinates intersected by the cutting path on an imaginary grid superimposed on the cutting board. The coordinate system may utilize Cartesian coordinates, polar coordinates, or the like. Accordingly, any arbitrary path may be followed by simply defining the coordinates of the path.

While the index pins 17 accurately locate the workpiece with respect to the superimposed coordinate system, care should be taken to insure that the actual coordinates of the nozzle's position are as close as possible to the programmed coordinates. Such accuracy is particularly necessary when the masterboard is densely populated with electronic components.

When electronic printed wiring boards are mass produced, it is preferable to perform as many operations as possible on a masterboard prior to cutting the masterboard into individual printed wiring boards. Accordingly, it is desirable to insert and solder electronic components, and perform all cleaning operations on the board, prior to the cutting of the masterboard. The density of electronic components on printed wiring boards is increasing dramatically. To avoid damage to electronic components during the cutting operation, the actual and programmed coordinate values must be as close as possible.

Once the cutting of the masterboard has been completed, the nozzle 12 is deactivated by the microprocessor and the platan bearing the cut masterboard is transported to the next station under microprocessor control. The cutting process is then repeated on the next masterboard.

Those skilled in the art will recognize that multiple cutting nozzles may be mounted on the x-y table and may be coupled to the illustrated nozzle 12 for movement therewith in one or both directions. Alternatively, the additional cutting nozzle(s) can be operated independently in one or both directions.

Figure 2:
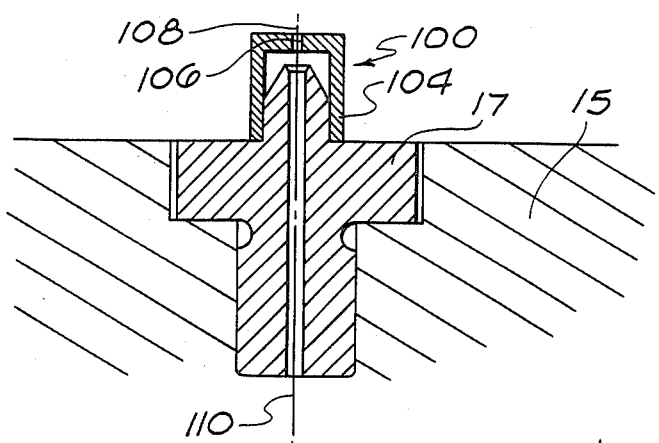
FIG. 2 is an enlarged fragmentary side elevation view, in section, taken along line 2—2 in FIG. 1 and showing an alignment device constructed in accordance with the invention.

In order to provide precise correlation between the nozzle's position and the desired position, the instant invention provides a means for initializing the nozzle position at a reference point prior to the cutting operation. Turning to FIG. 2, a fragmentary side elevation view in section of one the illustrated indexing pins 17 is illustrated. The pin 17 is a generally tubular body, the upper end of which is inwardly tapered. The bottom portion of the pin 17 is securly received within the tooling plate 15, as is known in the art.

An alignment device 100 constructed in accordance with the invention comprises a generally cylindrical body 104 having an internal diameter dimensioned to slightably engage a preselected pin 17 of the tooling fixture 15. The body 104 extends axially towards the nozzle 12. The end of the body closest to the nozzle is closed-ended except for a target gap in the form of a through hole 106 positioned axially between the nozzle 12 and pin 17.

The axis of the target hole 106 defines a reference position to which the nozzle 12 is initialized by coaxially aligning the axis of the fluid jet with the axis of the target hole. The axis 108 of the target hole 106 is illustrated as being aligned with the axis 110 of the pin, although those skilled in the art will understand that this is not necessary.

The target hole is dimensioned to be 0.004 inches larger in diameter than the fluid jet. When coaxially aligned with the target hole, the jet passes through without disruption. If the jet is not axially aligned, a large amount of spray is created by deflection of the jet off the top surface of the illustrated alignment member.

The alignment member 100 is formed from a 0.5 inch diameter Series 300 stainless steel cylinder which is 0.5 inches long. The hole is drilled concentric to the outside diameter of the cylinder and counter-bored to fit over the pin 17. The fluid jet is 0.10 inches in diameter and the tooling pin is 0.249 inches in diameter.

In operation, the cap is placed on the tooling pin and the nozzle is activated, preferably at a pressure below that required to cut. The position of the nozzle is adjusted either manually or by means of microprocessor control, until the jet passes through the target hole 106 with minimal or no spray. After passing through the target hole, the jet passes through the interior passageway of the tubular pin, and into the catcher 31 (FIG. 1). The cap is then removed and the cutting operation commenced.

Figure 3A:
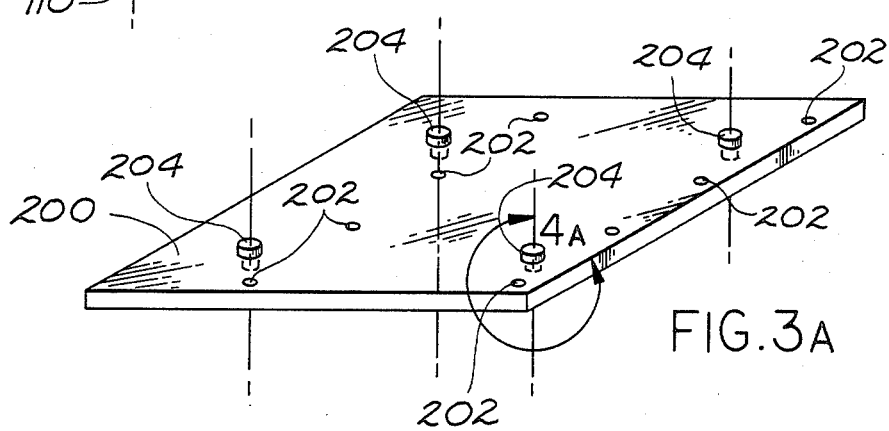
FIG. 3A is a perspective view of an alternative embodiment of the invention.
Figure 3B:
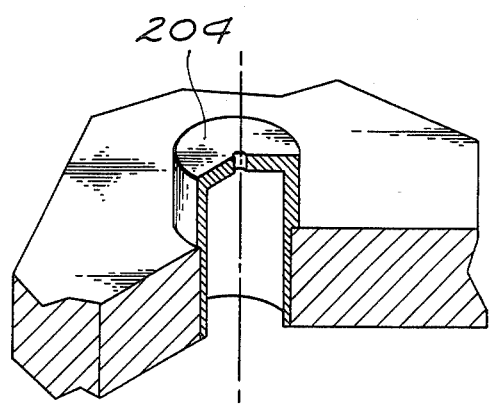
FIG. 3B is an enlarged fragmentary view in perspective of the encircled portion of FIG. 3A.

FIGS. 3A and 3B illustrate a second embodiment of the invention which is particularly suitable when the index pins 17 are non-tubular. A generally planar alignment plate 200 is formed from aluminum jig plate. The alignment plate 200 has a plurality of through holes 202 sized to removably and firmly receive the indexing pins 17 (FIG. 1) on the tooling plate 15.

The illustrated alignment plate 200 further includes four alignment caps 204 fixedly positioned within respective bore holes. The caps 204 are positioned with respect to the pin-receiving through holes 202 to be located at a pair of reference co-ordinates for aligning a nozzle 12. The illustrated plate 200, having four caps 204, is suitable for aligning a four-nozzle cutting system.

The caps 204 are formed from flame hardened steel and are similar to the alignment member 100 shown in FIG. 2.

Figure 4:
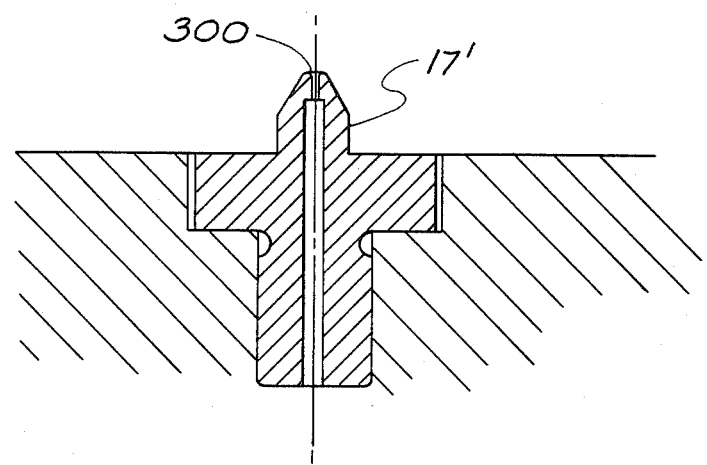
FIG. 4 is another embodiment of the invention.

FIG. 4 is an enlarged sectional view of another embodiment of the invention wherein the index pin itself is provided with a target hole. The top portion of the pin 17' has a target passageway 300 dimensioned in accordance with the earlier description of the target hole. The remaining portion of the pin is tubular, having an internal diameter that is larger than the diameter of the target passageway.

While the foregoing description includes detail which will enable those skilled in the art to practice the invention, it should be recognized that the description is illustrative and that many modifications and variations will be apparent to those skilled in the art having the benefit of these teachings. For example, the cap may be dimensioned to fit within a hole formed in the tooling fixture. Additionally, alignment caps with various sized orifices can be used to perform initial course adjustments and sequentially finer adjustments, ultimately bringing the jet into final alignment with the slightly larger diameter hole illustrated herein.

It is accordingly intended that the invention herein be defined solely by the claims appended hereto and that the claims be interpreted as broadly as permitted in light of the prior art.

I claim:

1. In a waterjet cutting system of the type wherein a jet-producing nozzle is moved through a succession of coordinate-defined positions in accordance with programmed instructions to cut a workpiece disposed within a work area defined by at least some of the co-ordinates, a method for aligning the actual positions of the fluid jet emerging from the nozzle and the programmed coordinates defining said position comprising the steps of:

positioning a target hole at a reference position corresponding to a set of reference coordinates and axially spaced from the fluid jet nozzle, the target hole including at least an axially-extending segment having a slightly larger effective cross-section than the cross-section of the fluid jet;

positioning the fluidjet nozzle at the programmed reference coordinates;

adjusting the relative position of the fluid jet nozzle and target hole segment for minimal disruption of the fluid jet as it passes through the segment; and referencing the succession of coordinate-defined positions to the position of minimum fluidjet disruption.

2. In a waterjet cutting system of the type wherein a jet-producing nozzle is moved through a succession of coordinate-defined positions in accordance with programmed instructions to cut a workpiece disposed within a work area defined by at least some of the co-ordinates, a method for aligning the actual positions of the fluid jet emerging from the nozzle and the programmed coordinates defining said position comprising the steps of:

positioning a target hole at a reference position corresponding to a set of reference coordinates and axially spaced from the fluid jet nozzle, the target hole including at least an axially-extending segment having a slightly larger effective cross-section than the cross-section of the fluid jet;

positioning the fluidjet nozzle at the programmed reference coordinates;

adjusting the relative position of the fluid jet nozzle and target hole segment for minimal disruption of the fluid jet as it passes through the segment; and referencing the cutting operation to the position of minimum fluidjet disruption.

3. The method of claim 2 including the intermediate step of generating the fluid jet at a pressure which is less than the pressure that causes cutting.

4. The method of claim 2 including the step of placing support means within the work area, including tooling means for accurately positioning the workpiece on the support means; and removably mounting a target hole-forming member on the tooling means prior to the adjusting step.

5. The method of claim 4 including the additional step of removing the hole-forming member from the tooling subsequent to the adjusting step and prior to the cutting operation.

6. For use in a fluid jet cutting system of the type including a nozzle for forming an axially directed jet of fluid, means for supporting a workpiece to be cut by the jet, means for accurately positioning the workpiece on the support means, and programmable means for moving the jet-producing nozzle through a succession of coordinate-defined positions in accordance with programmed instructions to cut the workpiece within a work area defined by at least some of the coordinates, an alignment device for precisely positioning the nozzle comprising:

means defining a target gap having a cross-section less than twice the cross-section of the fluid jet; and mounting means for axially spacing the gap from the nozzle at a reference position corresponding to a set of reference coordinates.

7. The device of claim 6 wherein the cross-section of the target gap is approximately 0.004 inches greater than the cross-section of the fluid jet.

8. For use in a fluid jet cutting system of the type including a nozzle for forming an axially directed jet of fluid, means for supporting a workpiece to be cut by the jet including pin members adapted to fit within corresponding holes in the workpiece for accurate positioning of the workpiece on the support means; an alignment device comprising:

means defining a target gap having a slightly greater cross-section than the cross-section of the fluid jet; and means for mounting the defined target gap on a workpiece-positioning pin member so that the gap is axially positioned between the nozzle and pin member.

9. The alignment device of claim 8 including a generally tubular body having one end dimensioned to slideably engage a pin-member and the other end generally closed but for a through hole having a slightly greater cross-section than the cross-section of the fluid jet.

10. The device of claim 8 including a plate having pin-accommodating means for precisely positioning the plate on the workpiece-supporting means, the plate having at least one through-hole having a cross-section approximately a few thousandths of an inch greater than the cross-section of the fluid jet and positioned on the plate so as to lie at a reference position when the plate is so positioned on the workpiece-supporting means.

11. In a waterjet cutting system of the type wherein a jet-producing nozzle is moved through a succession of coordinate-defined positions in accordance with programmed instructions to cut a workpiece disposed within a work area defined by at least some of the co-ordinates, a method for aligning the actual positions of the fluid jet emerging from the nozzle and the programmed coordinates defining said position comprising the steps of:
   positioning a target hole at a reference position corresponding to a set of reference coordinates and axially spaced from the fluid jet nozzle, the target hole including at least an axially-extending segment having a slightly larger effective cross-section than the cross-section of the fluid jet;
   positioning the fluidjet nozzle at the programmed reference coordinates; and
   equating the programmed coordinates for the reference position and the actual location of the reference position by adjusting the relative position of the fluid jet nozzle and target hole segment for minimal disruption of the fluid jet as it passes through the segment.

12. In a fluidjet cutting system of the type used to cut a workpiece positioned in a work area by means of a fluidjet emerging from a nozzle, a method for aligning the emerging fluid jet with the workpiece comprising the steps of:
   positioning a target hole at a reference point referenced to the workpiece, said reference point being axially spaced from the fluid jet nozzle, the target hole including at least an axially-extending segment having a slightly larger effective cross-section than the cross-section of the fluid jet; and
   positioning the fluid jet nozzle and target hole segment for minimal disruption of the fluid jet as it passes through the segment; and
   thereafter performing the cutting operation by moving a selected one of the nozzle and workpiece through a succession of coordinates defining the work area, said coordinates being substantially referenced to the position of minimum jet disruption.

13. A fluid jet cutting system comprising:
   a nozzle for producing an axially directed jet of fluid;
   means for supporting a workpiece to be cut by the jet including pin members adapted to fit within corresponding holes in the workpiece for accurate positioning of the workpiece on the support means;
   programmable means for moving the jet-producing nozzle through a succession of coordinate-defined positions in accordance with programmed instructions to cut the workpiece within a work area defined by at least some of the coordinates; an alignment device including means defining a target gap having a slightly greater cross-section than the cross-section of the fluid jet, and means for mounting the defined target gap on a workpiece-positioning pin member so that the target gap is axially positioned between the nozzle and pin member; and
   means for moving the nozzle with respect to the alignment device for coaxially aligning the jet with the target gap to establish a reference position thereat for the coordinate system.

14. A fluid jet cutting system comprising:
   a nozzle for producing an axially directed jet of fluid,
   means for supporting a workpiece to be cut by the jet including pin members adapted to fit within corresponding holes in the workpiece for accurate positioning of the workpiece on the support means, at least one of the pin members having an axially extending target gap having a slightly greater cross-section than the cross-section of the fluid jet; and
   programmable means for moving the jet-producing nozzle through a succession of coordinate-defined positions in accordance with programmed instructions to cut the workpiece within a work area defined by at least some of the coordinates; means for moving the nozzle with respect to the target gap for coaxially aligning the jet with the target gap to establish a reference position thereat for the coordinate system.

15. A fluid jet cutting system comprising:
   a nozzle for producing an axially directed jet of fluid,
   means for supporting a workpiece to be cut by the jet including pin members adapted to fit within corresponding holes in the workpiece for accurate positioning of the workpiece on the support means;
   programmable means for moving the jet-producing nozzle through a succession of coordinate-defined positions in accordance with programmed instructions to cut the workpiece within a work area defined by at least some of the coordinates; a plate having pin-accommodating means for precisely positioning the plate with respect to the workpiece-supporting means, the plate having at least one target gap with a cross-section approximately a few thousandths of an inch greater than the cross-section of the fluid jet and positioned on the plate so as to lie at a reference position when the plate is so positioned on the workpiece-supporting means; and
   means for moving the nozzle with respect to the target gap for coaxially aligning the jet with the gap to establish a reference position thereat for the coordinate system.

* * * * *